US011206657B2

(12) United States Patent
Yoo et al.

(10) Patent No.: US 11,206,657 B2
(45) Date of Patent: Dec. 21, 2021

(54) RESOURCE ELEMENT OFFSETTING IN A TELECOMMUNICATION SYSTEM (71) Applicant: Samsung Electronics Co., Ltd., Suwon-si (KR)

(72) Inventors: Hyunil Yoo, Suwon-si (KR); Mythri Hunukumbure, Middlesex (GB); Yinan Qi, Middlesex (GB); Hyungju Nam, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/766,666

(22) PCT Filed: Nov. 26, 2018

(86) PCT No.: PCT/KR2018/014621
§ 371 (c)(1),
(2) Date: May 22, 2020

(87) PCT Pub. No.: WO2019/103552
PCT Pub. Date: May 31, 2019

(65) Prior Publication Data
US 2021/0250915 A1 Aug. 12, 2021

(30) Foreign Application Priority Data

Nov. 24, 2017 (GB) .................................. 1719569.4
Nov. 22, 2018 (GB) .................................. 1819003.3

(51) Int. Cl.
*H04W 72/04* (2009.01)
*H04L 5/00* (2006.01)
*H04L 27/14* (2006.01)

(52) U.S. Cl.
CPC ......... *H04W 72/042* (2013.01); *H04L 5/0091* (2013.01); *H04L 27/14* (2013.01); *H04L 5/0035* (2013.01)

(58) Field of Classification Search
CPC ..... H04W 72/042; H04L 5/0091; H04L 27/14
See application file for complete search history.

(56) References Cited

U.S. PATENT DOCUMENTS

2017/0272226 A1  9/2017  Seo et al.
2019/0052433 A1  2/2019  Yoo et al.
(Continued)

FOREIGN PATENT DOCUMENTS

EP  3557811 A1  10/2019
EP  3618257 A1  3/2020
(Continued)

OTHER PUBLICATIONS

Samsung, "Discussion on PT-RS", 3GPP TSG RAN WG1 Meeting NR#3, Sep. 18-21, 2017, R1-1715968, 8 pages.
(Continued)

*Primary Examiner* — Ronald B Abelson (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Disclosed is a method of subcarrier index mapping for application to Phase Tracking Reference Signal, PTRS, within a Resource Block, RB, in a telecommunication system, wherein a particular subcarrier index to which PTRS
(Continued)

is mapped is determined on the basis of one or more of: Cell ID, DMRS Port Index, DMRS SCID UE-specific ID (RNTI).

6 Claims, 6 Drawing Sheets

(56) References Cited

U.S. PATENT DOCUMENTS

| | | | |
|---|---|---|---|
| 2019/0215118 A1* | 7/2019 | Moles-Cases | H04L 27/2611 |
| 2019/0296946 A1* | 9/2019 | Zhang | H04L 5/0051 |
| 2020/0052740 A1 | 2/2020 | Zhang et al. | |
| 2020/0076647 A1* | 3/2020 | Zhang | H04W 72/0446 |
| 2021/0044400 A1* | 2/2021 | Jiang | H04B 7/0639 |

FOREIGN PATENT DOCUMENTS

| | | |
|---|---|---|
| EP | 3641256 A1 | 4/2020 |
| GB | 2568672 A | 5/2019 |
| WO | 2017/200315 A1 | 11/2017 |
| WO | 2018027222 A1 | 2/2018 |
| WO | 2018/204756 A1 | 11/2018 |
| WO | 2018/230133 A1 | 12/2018 |
| WO | 2019/031721 A1 | 2/2019 |
| WO | 2019/096919 A1 | 5/2019 |

OTHER PUBLICATIONS

Samsung, "Discussion on PT-RS", 3GPP TSG RAN WG1 Meeting 90bis, Oct. 9-13, 2017, R1-1717631, 9 pages.
Ericsson, "Details on PTRS design", 3GPP TSG-RAN WG1 NR Ad Hoc #3, Sep. 18-21, 2017, R1-1716373, 22 pages.
Panasonic, "PT-RS design", 3GPP TSG RAN WG1 Meeting #90bis, R1-1717779, 9 pages.
Ericsson, "Remaining details on PTRS design", 3GPP TSG RAN WG1 Meeting 91, Nov. 27-Dec. 1, 2017, R1-1720741, 15 pages.
NEC, "Remaining issues on PTRS configurations", 3GPP TSG RAN WG1 Meeting 91, Nov. 27-Dec. 1, 2017, R1-1720576, 3 pages.
International Search Report dated Feb. 27, 2019 in connection with International Patent Application No. PCT/KR2018/014621, 3 pages.
Written Opinion of the International Searching Authority dated Feb. 27, 2019 in connection with International Patent Application No. PCT/KR2018/014621, 5 pages.
Combined Search and Examination Report under Sections 17 & 18(3) dated Apr. 18, 2019 in connection with United Kingdom Patent Application No. GB1819003.3, 8 pages.
Combined Search and Examination Report under Sections 17 & 18(3) dated Apr. 30, 2020 in connection with United Kingdom Patent Application No. GB2002614.2, 5 pages.
Samsung, "Discssion on PT-RS", 3GPP TSG RAN WG1 Meeting 91, Nov. 27-Dec. 1, 2017, R1-1720312, 7 pages.
Panasonic, "PT-RS design", 3GPP TSG RAN WG1 Meeting #91, Nov. 27-Dec. 1, Oct. 2017, R1-1720370, 9 pages.
Intel et al., "Joint WF on PTRS", 3GPP Draft, R1-1718998, 7 pages.
Supplementary European Search Report dated Jul. 9, 2021 in connection with European Patent Application No. 18 88 0162, 13 pages.

* cited by examiner

RESOURCE ELEMENT OFFSETTING IN A TELECOMMUNICATION SYSTEM

CROSS-REFERENCE TO RELATED APPLICATIONS

This application is a 371 of International Application No. PCT/KR2018/014621 filed on Nov. 26, 2018, which claims priority to United Kingdom Patent Application No. 1719569.4 filed on Nov. 24, 2017 and United Kingdom Patent Application No. 1819003.3 filed on Nov. 22, 2018, the disclosures of which are herein incorporated by reference in their entirety.

1. FIELD

The present invention relates to methods for offsetting Resource Elements, particularly in relation to the selection of a subcarrier for PTRS mapping.

2. DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In standardization meetings, it has been agreed to support Resource Element (RE)-level offset for selecting subcarrier for mapping Phase Tracking Reference Signal (PTRS) within a Resource Block (RB) by implicit derivation. The implicit derivation method such as associated Demodulation Reference Signal DMRS port index, SCID, Cell ID is to be decided.

Figure 1:
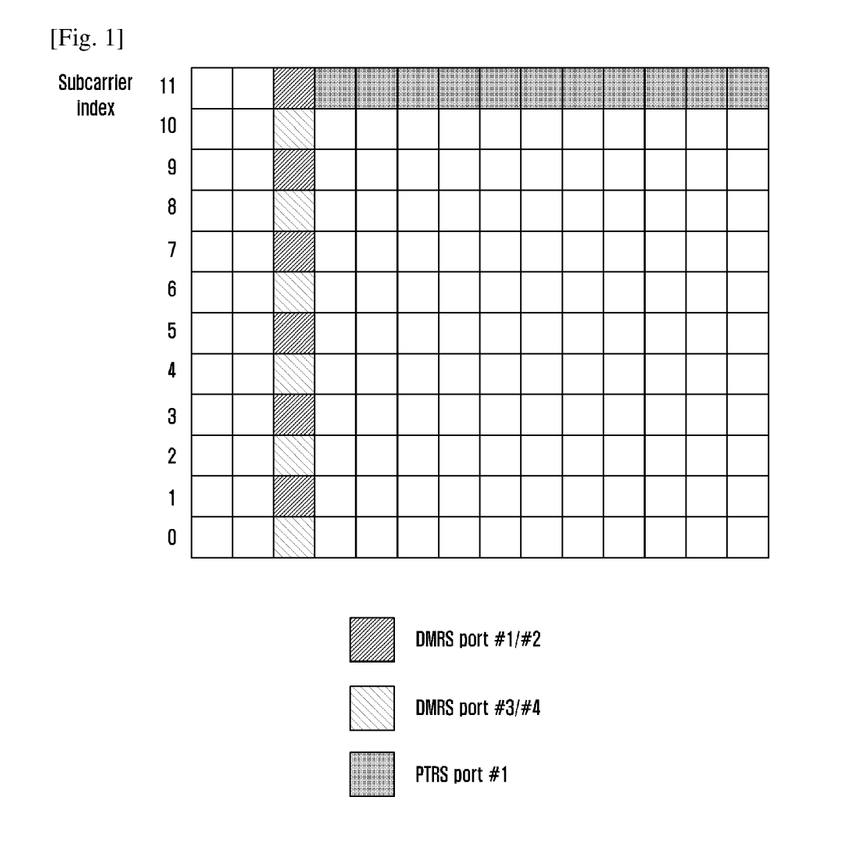
FIG. 1 shows an example of PTRS mapping in a single cell.

FIG. 1 shows an example of PT-RS mapping to lowest DMRS port index. In this figure, it is assumed that the gNB has configured DMRS port #1 to UE. Then there are 6 opportunities in a RB for PTRS allocation, {1,3,5,7,9,11}-th subcarrier index. The simplest way to allocate PTRS port to subcarrier is use highest/lowest index of subcarrier. In FIGS. 1-4, the x-axis is time and the y-axis is subcarrier index.

Figure 2:
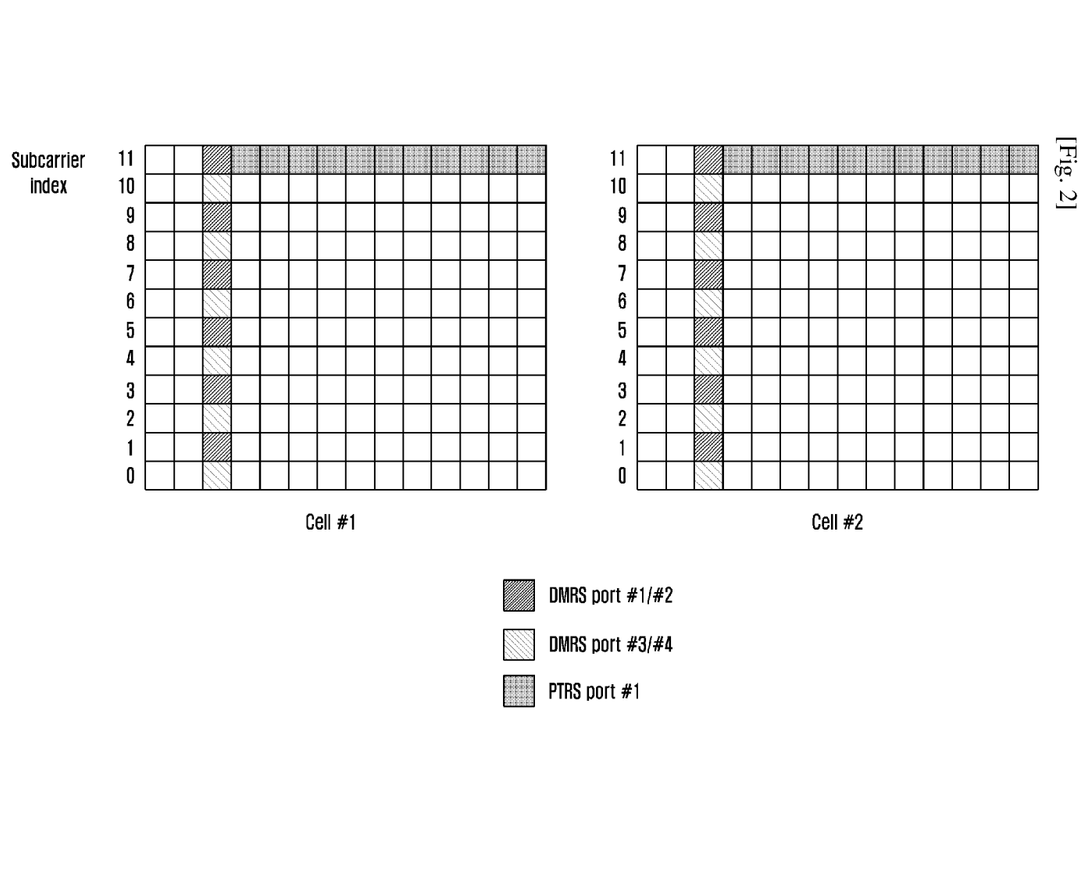
FIG. 2 shows an example of PTRS mapping in two neighboring cells.

Although allocating PT-RS to the lowest/highest subcarrier index is relatively simple, inter-cell interference between PT-RS and PT-RS can occur. FIG. 2 shows an example of how interference can occur between neighboring cells. When each gNB configure DMRS port #1 in a DMRS group, PT-RS from each cell would have same subcarrier index. In addition, has been agreed in standardization discussions to allow PT-RS power boosting.

It is clear that performance of phase tracking decreases with inter-cell interference between PT-RS and PT-RS compared to the interference between PT-RS and data. By using PT-RS RE-level offset, inter-cell PT-RS interference can be reduced. In other words, if the PT-RS of each neighboring cell is allocated with a different subcarrier index, only inter-cell interference between PT-RS and data occurs, which can boost overall performance.

SUMMARY

It is therefore an aim of embodiments of the present invention to address aforementioned and other issues.

According to a first aspect of the present invention, there is provided a method of subcarrier index mapping for application to Phase Tracking Reference Signal, PTRS, within a Resource Block, RB, in a telecommunication system, wherein a particular subcarrier index to which PTRS is mapped is determined on the basis of one or more of: Cell ID (may be virtual ID), DMRS Port Index, DMRS SCID UE-specific ID (RNTI).

In an embodiment the subcarrier index is determined by:

$$k_c = \mathrm{mod}(c_{int}, F),$$

where $k_c$ is a subcarrier index of each cell, $c_{int}$ is a cell ID or DMRS SCID and F is a number of possible PT-RS subcarrier index associated with the same DMRS port.

In an embodiment the subcarrier index is the largest or smallest subcarrier index among possible PT-RS subcarrier indices associated with the same DMRS port.

In an embodiment the subcarrier index is the lowest subcarrier index among subcarrier indices related to the lowest DMRS port index on which PTRS is not transmitted when the same subcarriers are chosen for different DMRS ports.

In an embodiment the mapping is defined in terms of an offset from a default position.

According to an aspect of the present invention, there is provided a method of a UE determining and applying a Resource Element, RE, offset for PTRS mapping comprising the steps of:
- the UE receiving a message including Cell ID, and/or virtual Cell ID, and/or DMRS SCID, and/or DMRS port index, and/or other UE specific parameters;
- the UE identifying Cell ID, and/or virtual Cell ID, and/or DMRS SCID, and/or DMRS port index, and/or other UE specific parameters;
- the UE deriving the RE offset to be applied to PTRS;
- the UE applying the RE offset for PTRS and locating PTRS based on the RE offset.

According to an aspect of the invention, there is provided apparatus arranged to perform the method of any preceding aspect.

Embodiments of the invention are operable to improve performance by mitigating the risk associate with PTRS being mapped identically for neighboring cells. By making use of the technique set out herein, this problem may be avoided or at least minimized and overall network performance may be enhanced.

BRIEF DESCRIPTION OF THE DRAWINGS

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

For the same reason, in the accompanying drawings, some constituent elements are exaggerated, omitted, or roughly illustrated. Further, sizes of some constituent elements may not accurately reflect the actual sizes thereof.

In the drawings, the same drawing reference numerals may be used for the same elements across various figures.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, are for implementing the functions specified in the flowchart block or blocks.

In an implicit method according to an embodiment, PT-RS can be allocated by estimated cell ID. As each cell may have a unique cell ID, cell ID may be different between neighboring cells. PT-RS can be mapped with an RE-level subcarrier index offset according to its cell ID.

Figure 3:
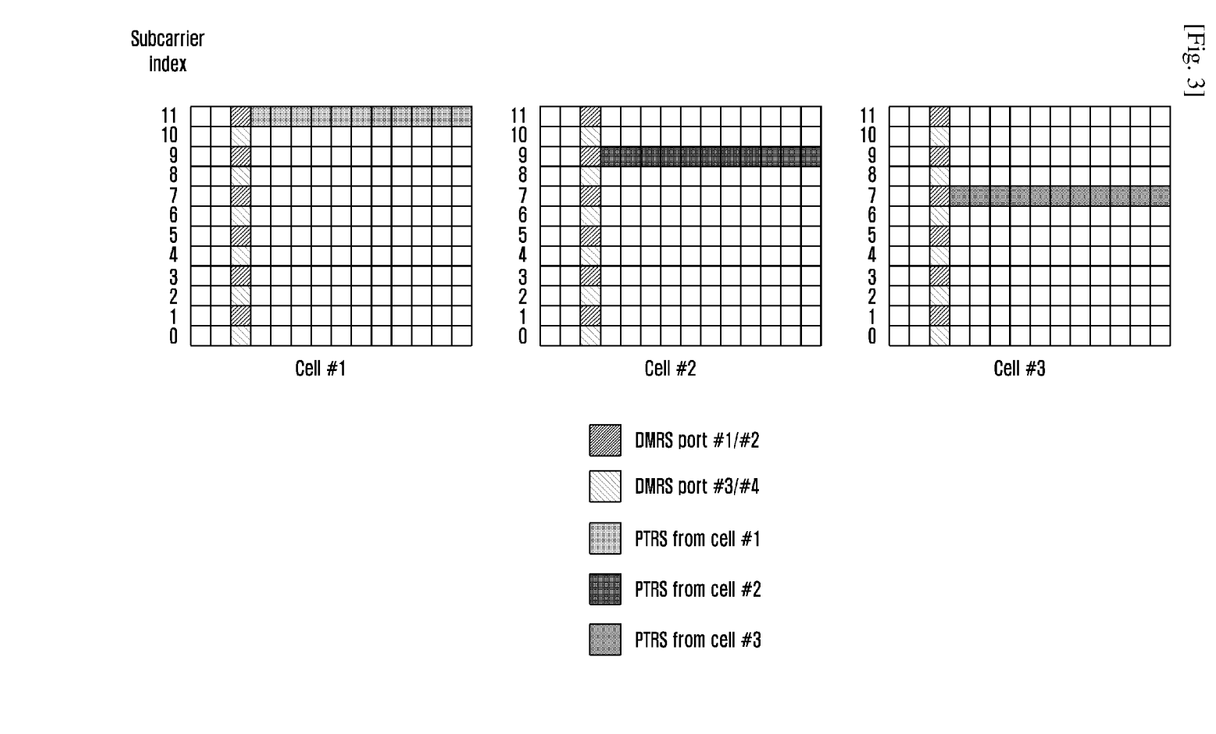
FIG. 3 shows an example of PTRS mapping in three neighboring cells, with an offset determined by cell ID.

FIG. 3 shows an example of PT-RS allocation based on detected cell ID RE-level offset. In FIG. 3, it can be seen that PT-RS(s) are allocated on different subcarrier indices by cell ID based RE-level offset so that interference between PT-RS from neighboring cells can be avoided without any additional signaling overhead. For example, the PT-RS subcarrier index of each cell can be determined as follows:

$$k_c = \mathrm{mod}(c_{int}, F),$$

where $k_c$ is a subcarrier index of each cell, $c_{int}$ is a cell ID and F is a number of possible PT-RS subcarrier index. In FIG. 3, since the DM-RS port #1 has 6 REs, there are 6 possible PT-RS subcarrier index, i.e., F=6.

As another implicit method (i.e. one avoiding the need for explicit signaling), PT-RS can be allocated by another UE specific parameter such as SCID. Compared to PT-RS allocation based on the cell ID, PT-RS allocation based on a UE specific parameter may have the same PT-RS subcarrier index as one or more neighboring cells. In order to avoid the same PT-RS subcarrier index, the PT-RS allocation information should be shared between neighboring cells. This may increase the network overhead. In other words, it is difficult to avoid interference between PT-RS from a neighboring cell based on a UE specific parameter.

Figure 4:
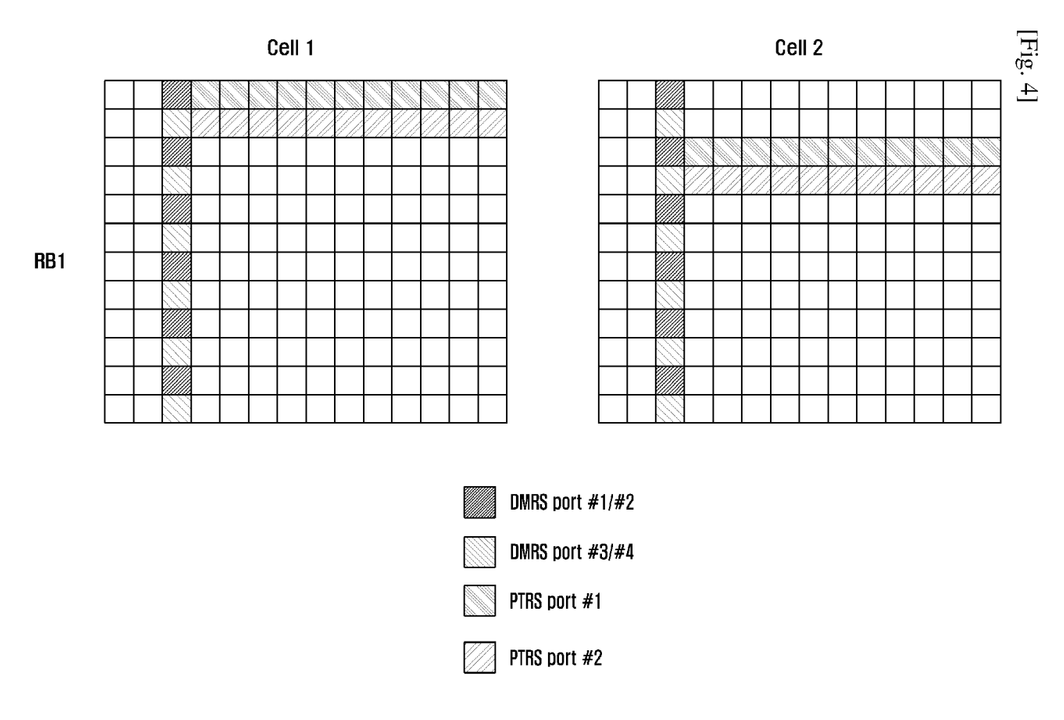
FIG. 4 shows an example of PTRS mapping in neighboring cells taking into account DMRS.

FIG. 4 shows an example of multiple PT-RS port mapping to lowest DMRS port index. In FIG. 4, if PT-RS port #1 is associated with DM-RS port #1/#2 and PT-RS port #2 is associated with DM-RS port #3/#4, there is no ambiguity for PT-RS ports sub-carrier index since the DM-RS port #1/#2 and DM-RS port #3/#4 have different sub-carrier location.

However, if PT-RS port #1 is associated with DM-RS port #1 and PT-RS port #2 is associated with DM-RS port #2, there is an ambiguity since DM-RS port #1 and DM-RS port #2 have the same sub-carrier location. To resolve this ambiguity, the PT-RS can be allocated to the lowest or the next lowest subcarrier among subcarriers related to lowest DMRS ports index on which PT-RS is not transmitted.

The RE offset dependence on Cell ID can be either explicit or implicit. In the implicit case, the RE offset can depend on DMRS scrambling ID, which depends on Cell ID or virtual Cell ID. DMRS SCID can also be derived from UE specific indication, DCI, or RRC or may be broadcast by the gNB. Note that the Cell ID could also be virtual Cell ID.

The RE offset can also depends on multiple IDs including DMRS SCID and/or DMRS port index, and/or Cell ID/virtual Cell ID.

Figure 5A:
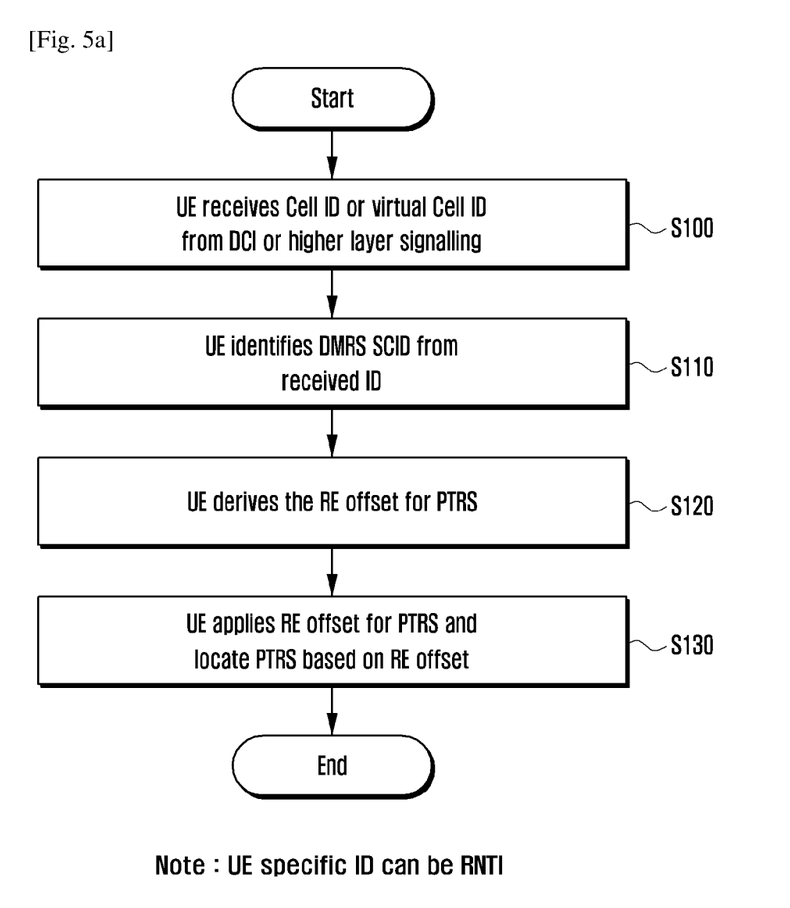
FIGS. 5a and 5b show flowcharts according to embodiments of the invention.
Figure 5B:
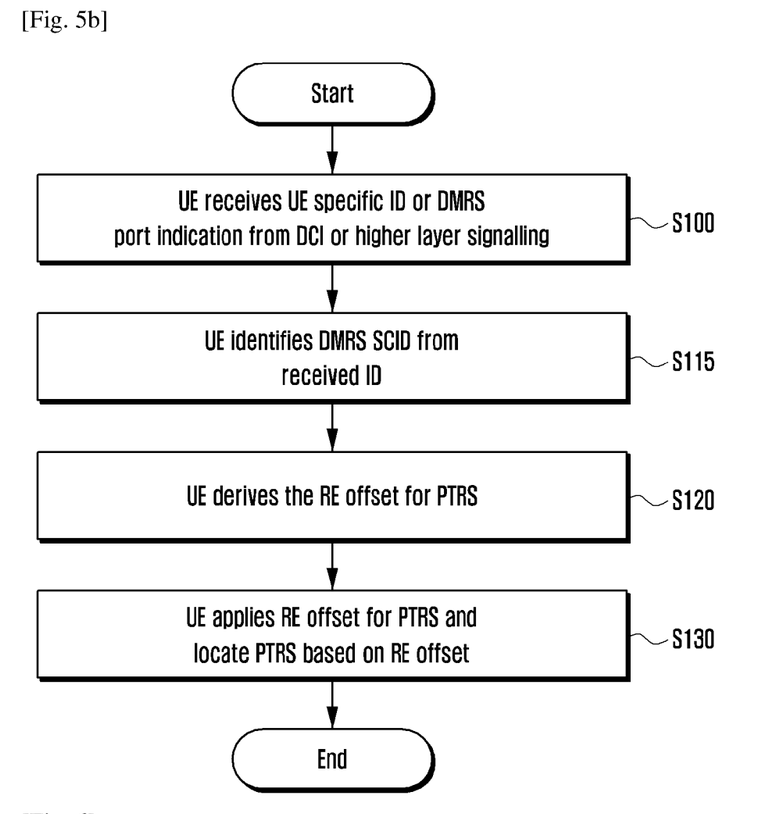

FIGS. 5a and 5b show alternative flowcharts for carrying out a method of the invention according to different embodiments.

In FIG. 5a, at step S100, the UE receives a message including Cell ID or virtual Cell ID from DCI or some higher level signaling, such as RRC.

At step S110, the UE identifies DMRS SCID from the received Cell ID.

At step S120, the UE derives the RE offset to be applied to PTRS as set out previously.

At step S130, the UE applies the RE offset for PTRS and locates PTRS based on the RE offset.

The embodiment shown in FIG. 5b differs only in that step S100 is replaced with step S105. In step S105 the UE receives a UE specific ID or DMRS port indication from DCI or higher layer signaling. Otherwise, flow in FIG. 5b continues as in FIG. 5a.

Figure 6:
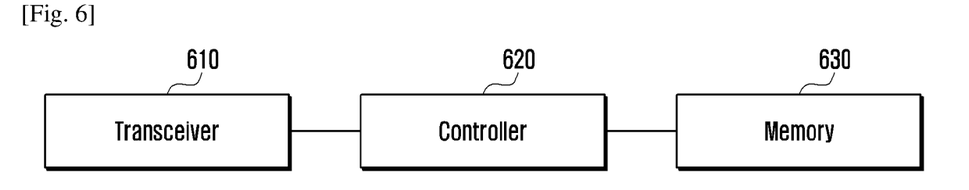
FIG. 6 is a block diagram of an apparatus according to an embodiment of the present invention.

FIG. 6 is a block diagram of an apparatus according to an embodiment of the present invention.

As illustrated in FIG. 6, an apparatus according to the present disclosure may include a transceiver 610, a memory 630 and a controller 620 coupled with the transceiver 610 and the memory 630.

In an embodiment, the controller 620 is configured to control the transceiver 610 to transmit and receive signals, determine a subcarrier index to which PTRS is mapped based on at least one of a cell ID, DMRS port index, DMRS SCID, UE-specific ID (RNTI).

The memory 630 may store at least one of information transmitted and received through the transceiver 610 and information generated through the controller 620.

Figure 7:
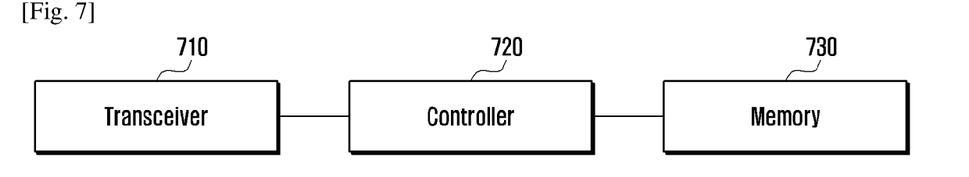
FIG. 7 is a block diagram of a user equipment according to an embodiment of the present invention.

FIG. 7 is a block diagram of a user equipment according to an embodiment of the present invention.

As illustrated in FIG. 7, a UE according to the present disclosure may include a transceiver 710, a memory 730 and a controller 720 coupled with the transceiver 710 and the memory 730.

In an embodiment, the controller 720 is configured to control the transceiver 710 to receive a message including at least one of a cell ID, DMRS port index, DMRS SCID, UE-specific ID (RNTI), and derive a RE offset based to be applied to PTRS based on the received message.

The memory 730 may store at least one of information transmitted and received through the transceiver 710 and information generated through the controller 720.

Embodiments of the invention are operable to improve performance by mitigating the risk associate with PTRS being mapped identically for neighboring cells. By making use of the technique set out herein, this problem may be avoided or at least minimized and overall network performance may be enhanced.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal, in a wireless communication system, the method comprising:
  receiving, from a base station, information on a resource element (RE) offset of a phase tracking reference signal (PTRS);
  receiving, from the base station, information on a demodulation reference signal (DMRS) port associated with a PTRS port;
  identifying a subcarrier where the PTRS is to be mapped within subcarriers used by the DMRS port based on the information on the RE offset of the PTRS, wherein the subcarriers used by the DMRS port are identified based on the information on the DMRS port associated with the PTRS port; and
  transmitting, to the base station, the PTRS on the identified subcarrier,
  wherein the identified subcarrier is a subcarrier having a lowest index among subcarriers, related to the DMRS port, on which the PTRS is not transmitted, in case that same subcarriers are assigned for different DMRS ports.

2. The method of claim 1, wherein the information on the RE offset of the PTRS is transmitted by a radio resource control (RRC) signaling.

3. The method of claim 1, wherein the information on the DMRS port associated with the PTRS port is transmitted by downlink control information (DCI).

4. A terminal in a wireless communication system, the terminal comprising:
- a transceiver; and
- a controller configured to:
  - control the transceiver to receive, from a base station, information on a resource element (RE) offset of a phase tracking reference signal (PTRS);
  - control the transceiver to receive, from the base station, information on a demodulation reference signal (DMRS) port associated with a PTRS port;
  - identify a subcarrier where the PTRS is to be mapped within subcarriers used by the DMRS port, based on the information on the RE offset of the PTRS, wherein the subcarriers used by the DMRS port are identified based on the information on the DMRS port associated with the PTRS port; and
  - control the transceiver to transmit, to the base station, the PTRS on the identified subcarrier,
- wherein the identified subcarrier is a subcarrier having a lowest index among subcarriers, related to the DMRS port, on which the PTRS is not transmitted, in case that same subcarriers are assigned for different DMRS ports.

5. The terminal of claim 4, wherein the information on the RE offset of the PTRS is transmitted by a radio resource control (RRC) signaling.

6. The terminal of claim 4, wherein the information on the DMRS port associated with the PTRS port is transmitted by downlink control information (DCI).

* * * * *